R. N. MARTZ.
HOSE COUPLING.
APPLICATION FILED JAN. 27, 1916.
1,238,928.
Patented Sept. 4, 1917.
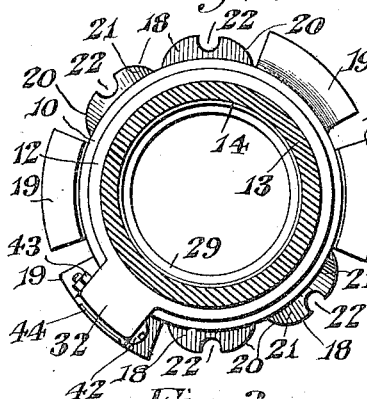
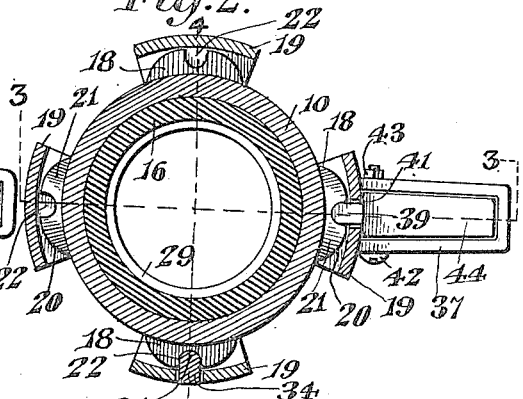
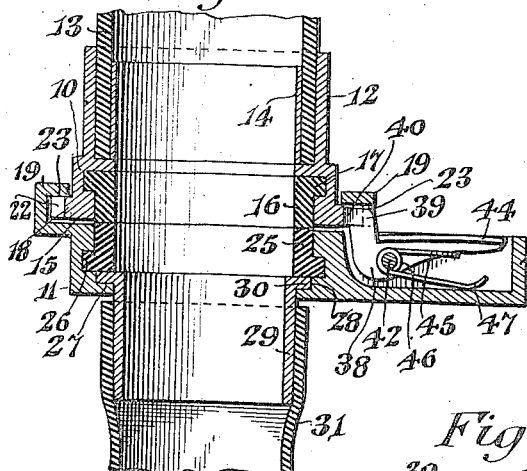
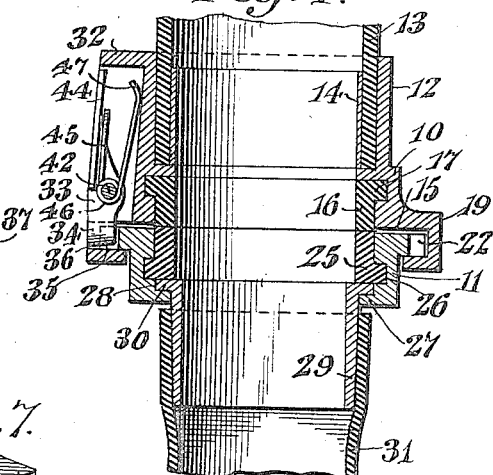
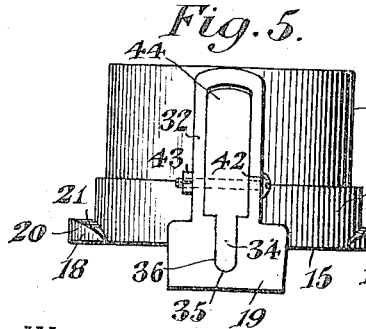
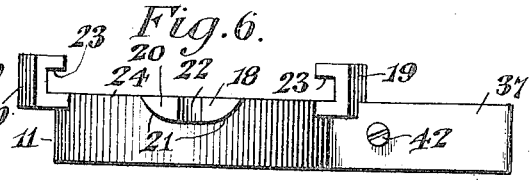
WITNESSES:
Randolph N. Martz, INVENTOR
BY
Attorney

UNITED STATES PATENT OFFICE.

RANDOLPH N. MARTZ, OF FREDERICK, MARYLAND, ASSIGNOR TO CHARLES C. CARTY, OF FREDERICK, MARYLAND.

HOSE-COUPLING.

1,238,928.  Specification of Letters Patent.  Patented Sept. 4, 1917.

Application filed January 27, 1916. Serial No. 74,633.

*To all whom it may concern:*

Be it known that I, RANDOLPH N. MARTZ, a citizen of the United States, residing at Frederick, in the county of Frederick and State of Maryland, have invented a new and useful Hose-Coupling, of which the following is a specification.

The present invention relates to an improvement in hose couplings, and has particular reference to certain improvements in the hose coupling set forth and described in Letters Patent No. 1,128,474, granted me February 16, 1915.

The principal object of the present invention is to provide a hose coupling, which possesses all of the advantages of the hose coupling described in my prior patent above referred to, and which at the same time is provided with an automatic latch for interlocking the opposed tubular sections of the coupling when they are brought into proper interfitting engagement, and to provide means whereby the latches may be quickly and easily released, so that the coupling may be disconnected quickly, and with comparative ease.

Another object of the present invention is to provide each section of the coupling with a latch, so peculiarly mounted in the section that it is protected and housed, and at the same time is in position for ready access for releasing the latch when it is desired to disconnect the sections. This object of the invention also contemplates the provision of projections on each one of the tubular sections of the coupling, so that when the projections are interfitted, the latch may engage the opposed interfitting projections, and thus interlock the same to hold the members from accidental disengagement by vibration, or the like.

A still further object of this invention is to provide a coupling of this character having all of the above noted features, with a swiveled nipple to which the hose, or other pipe, may be connected, so as to admit of the free rotation of one of the tubular members upon the end of the hose.

Other objects and advantages of this invention will appear from the following specific disclosure of the present preferred embodiment of this invention, the same being illustrated in the accompanying drawing; wherein:

Figure 1 is an end elevation of the improved coupling having the tubular sections thereof abutting, and in position to be interfitted, the hose being shown in section.

Fig. 2 is a transverse sectional view, through the coupling, with the members interfitted and interlocked, the section being taken through the interfitting projections carried upon the opposite sections.

Fig. 3 is a longitudinal central sectional view, taken on the line 3—3 of Fig. 2, and showing the coupling in the position of Fig. 2.

Fig. 4 is a longitudinal central sectional view, taken on the line 4—4 of Fig. 2, and showing the parts interfitting and interlocked.

Fig. 5 is a detail side elevational view of one of the tubular sections of the coupling, showing the side upon which the latch is mounted.

Fig. 6 is a side elevational view of the opposed tubular section of the coupling, showing the projecting housing and handle for the latch and section.

Fig. 7 is a detail perspective view of one of the latches.

Fig. 8 is a detail perspective view of one of the springs employed for actuating the latches.

Referring to the drawing, wherein like parts are designated by similar numerals of reference throughout the several views, 10 designates one tubular member of the coupling, and 11 designates the opposite tubular member thereof. The tubular member 10 is provided with an integral rearwardly extending ferrule 12 into which is fitted one end of a hose or pipe 13. The hose 13 is expanded and held tight against the inner wall of the ferrule 12, by an expanding ring or thimble 14, which is fitted into the ferrule 12 and the end of the pipe 13, and permitted to expand against the latter to bind it in place. The member or section 10 has an outer flat engaging face 15, and is provided in its outer end with an elastic gasket or packing ring 16 flanged at its inner edge as at 17 to fit into a correspondingly formed annular interior groove provided in the inner wall of the section 10. As shown in Figs. 3 and 4, this gasket 16 extends slightly beyond the engaging face 15 of the section, so as to admit of the slight compression of the gasket 16, when the coupling sections are assembled, and thus provide for a relatively tight sealed joint. The section 10 is further provided with a plurality of radiating projections at its outer end, the projections being in the form of lugs 18, and keepers 19, which are alternately arranged in equidistantly spaced relation about the periphery of the section 10. The lugs 18 have their outer surfaces flush with the engaging or abutting face 15 of the section, while the keepers 19 project outwardly beyond the abutting face 15 and lie wholly outside of the cylindrical plane of the section 10. The lugs 18 are of segmental form, as may be best seen from Figs. 1 and 2, and are provided with opposed peripheral cam faces 20, which merge into the peripheral face of the section 10. The lugs 18 are also provided at their opposite ends and at their inner sides with cam faces 21, which are employed for binding the opposed sections of the coupling together, as will hereinafter appear. Intermediate the ends of the lugs 18, recesses or notches 22 are provided which extend entirely through the lugs 18 from their front to their rear faces. The keepers of the section 10 comprise forwardly offset hooks with curved passages therein of a size to receive the lugs 18, and which have inner binding faces 23 lying in parallelism with, but spaced outwardly from, the abutting face 15 of the section. The tubular section or member 11 of the pipe coupling is provided with a forward flat abutting face 24 to engage flat against the face 15, when the sections 10 and 11 are assembled. This section 11 is also provided with a similar number of correspondingly shaped and formed projections 18 and 19, and adapted to interfit therewith. The projections 18 on the section 11 are of lug form and are of the identical contour, and are located in a similar manner, as are the lugs 18 of the section 10. The keepers or hooks 19 of the section 11 are also of similar form and arrangement as are the keepers 19 of the section 10. The keepers and the lugs of both sections are alternately arranged in a circular row around the periphery of each section, and are spaced apart a sufficient distance to admit of the passage of the opposed projections therebetween as the members are assembled. The section 11 is provided with an elastic gasket 25 fitting in the outer end thereof and having an annular flange 26 seating in an interior annular groove formed in the inner wall of the section 11. As may be best seen from Figs. 3 and 4, the section 11 is relatively shallow, or is of ring form and is provided upon its inner end with an inwardly extending flange 27 providing against its inner side a shoulder or rabbet 28, which faces toward the outer end of the section 11. A nipple 29 is fitted in the inner end of the section 11 and has an outturned flange 30 thereon, rotatably fitting against the shoulder or rabbet 28, whereby the nipple 29 is free to turn independently of the section 11, but is carried thereby. The inner end of the nipple 29 is flat, and the flange 30 is integral therewith, so as to provide a substantially flat engaging face between the nipple and the inner adjacent end of the gasket 25 which abuts the nipple and thus forms a sealed joint between the section 11 and the rotatable nipple carried thereby. An opposed length or section of hose 31 is fitted over the nipple 29, the swiveling of the nipple 29 in the section 11 admitting of the turning of the section 11 independently of the length of hose 31.

The section 10 is provided at one side with a longitudinal hollow projection 32 providing a casing or housing for the reception of a locking latch 33, which extends longitudinally in the casing. The projection 32 is integral with one of the keepers 19, as shown to advantage in Fig. 5, and the latch 33 is provided with a nose or extension 34, which projects into the keeper 19, and lies in the inner circular channel therethrough, so as to interrupt the channel and engage the lug 18 of the opposite section, when the coupling is assembled. This nose 34 is of a width slightly less than that of the recess or notch 22 formed in the lug 18, and is adapted to seat in the recess 22 and hold the lug 18 from movement laterally out of the keeper 19. The nose 34 is provided with an inner rounded face 35 adapted to ride over the cams 20 at the opposite ends of the lug 18, so as to automatically retract the latch as the sections 10 and 11 are interfitted, and to place the latch in position to automatically lock the interfitting projections together. The nose 34 of the latch 33 projects through a recess or opening 36 formed in the outer side of the keeper 19, so that when the nose 34 is retracted it moves outwardly through the opening 36 to clear the lug 18 within the keeper.

The section 11 is provided with a radially extending housing 37 at one side thereof and which is integral with the adjacent keeper 19. A latch 38 is mounted in the projection or casing 37, and is provided with an outwardly offset nose 39 having a rounded inner engaging face 40 adapted to seat in the notch 22 of the opposed lug 18, when fitting in the adjacent keeper 19. The keeper 19 has intermediate its ends, a recess or opening 41 through which the nose 39 is adapted to project and through which the nose may move in its retraction from the lug 18.

Each of the latches 33 and 38 extend longitudinally in their respective housings or projections 32 and 37, and are hingedly mounted adjacent their noses upon transverse pins 42 extending through the housings, and shown in the present instance as in the form of bolts having heads engaging against one side of each of the housings and having retaining nuts 43 binding against the opposite outer sides of the housings. The bolts 42 pass through the intermediate portions of the latches 33 and 38 to pivotally support the latter, the latches each having a finger plate 44 upon its upper edge, which is of substantial width and length to entirely close the outer open sides of the respective casings 32 and 37. The finger plates 44 are held in extended or outward position, as shown in Figs. 3 and 4, by means of a spring 45. The spring 45 is in the shape of a length of wire bent U-shaped and having the intermediate portions of the opposite ends thereof coiled or looped to provide hinge eyes 46 for engagement around the pivot pins 42, at the opposite sides of the respective latches 33 and 38. The looped or closed ends of the springs 45 bear against the inner or under sides of the finger plates 44, so as to hold the same extended, and thus yieldingly and normally hold the latches in locking position. The free ends 47 of the springs are slightly curved outwardly to provide rounded cam ends to the spring to admit of the sliding thereof in the bottom of the housings during the compression and expansion of the springs, when the latches are operated. It will be noted that the finger plates 44 in both instances house not only the latches 33 and 38, but also all parts of the springs 45 and the inner parts of the pivot pins 42.

When it is desired to connect the hose 13 to the hose 31, the sections 10 and 11 are brought together with their engaging faces 15 and 24 in abutting relation, and the sections 10 and 11 are so relatively turned with respect to each other, as to bring the opposed projections 18 and 19 into offset relation, as shown in Fig. 1. It is, of course, understood that any number of these projections 18 and 19 may be employed, but in the present instance, each section is disclosed as having four projections providing, when the coupling is assembled, two pairs of diametrically opposed interfitting projections.

The parts thus abutting, as shown in Fig. 1, the sections 10 and 11 are turned relatively to each other, preferably by rotating the swiveled section 11, to engage the lugs 18 in the keepers 19 of the opposite sections. As the lugs 18 enter the keepers, the binding cam faces 21 thereof engage against the straight binding faces 23 of the keepers to draw the sections 10 and 11 together, and compress the gaskets 16 and 25 together, to thus securely bind the sections together, and seal the joint therebetween. The operator is assisted materially, in the relative turning of the sections 10 and 11, by the projections or housings 32 and 37, which constitute handles. The handles may be employed by grasping the handle 32 to hold the section 10 from turning, and simultaneously grasping the handle 37 to rotate the section 11 thereby. The latch plates 44 are mounted in the handles 32 and 37 so that in the act of turning the sections relatively to uncouple the members, the plates 44 may be easily depressed by the fingers of the adjacent hands grasping the handles. This binding together of the gaskets 16 and 25 also binds the gasket 25 against the inner abutting face of the nipple 29, so as to effectively seal the joint between the nipple and the section 11. At the same time, the lugs 18 engage their cam faces 20 against the rounded faces 35 and 40 of the latches 33 and 38 to retract the same against the tensions of their respective springs 45, and hold the latches retracted until the recesses in the lugs 18 and the keepers 19 are brought into registry, at which time the noses 34 and 39 of the latches snap into the recesses, and thus interlock the interfitting projections from relative lateral movement in either direction.

When it is desired to separate the sections 10 and 11, it is only necessary to depress the finger plates 44, whereby to retract the latches 33 and 38 of the sections from the adjacent interfitting lugs, and to then rotate the sections relatively to each other, whereby to disengage the interfitting projections.

It is thus seen that the coupling of this invention possesses all of the advantages of the coupling set forth in the prior patented structure above referred to, and that in addition it provides a locking means, which is automatically retracted and is always in position to interlock the projections as soon as they are brought into registry with each other; and wherein the lock may be easily released, by pressure upon the finger plates in the natural manner of grasping the coupling members for relatively turning the same.

These combined handles and latches are so mounted that they not only serve as hand holds for the sections, but they also serve as locks for the projections when the same are interfitted. It is unnecessary to provide shoulders or any other devices on the members to interlock the same, as the lugs themselves, by their peculiar formation, serve not only to bind the sections together, but also to receive the latches and serve as locking elements. The outer or free ends of the latches 33 and 38 are each reduced in thickness, or are tapered as shown, to accommodate the intermediate or bridge pieces of the springs 45 and admit of their engagement, substantially, against the finger plates 44.

It is, of course, understood that it is within the spirit of the invention to make such changes and modifications as are permissible within the scope of the following claims.

What is claimed is:—

1. In a hose coupling, a section having a keeper thereon open at its opposite ends, a latch carried by the section and having a nose projecting into the keeper midway between its ends, a second section having a lug provided with cam faces on its opposite ends for binding engagement in the opposite ends of the keeper to draw the sections together upon the relative turning of the same, the lug having a second pair of cam faces on its opposite ends and at its inner side for engagement with the opposite sides of said nose to retract the same, said lug also having a notch therein between said second pair of cam faces adapted to receive said nose upon the registry of the latter with the notch.

2. In a hose coupling, a section having a lug with a notch therein, a second section having a keeper with an opening in its wall and adapted to receive the lug, the ends of said sections abutting each other whereby when the sections are rotated relatively to each other around their axis the keeper and lug will interlock clamping the sections against separation, a latch lever pivoted upon the second section and having a nose on its end adapted to project through said opening in the keeper and into said notch in the lug and lock the lug in the keeper, and having a finger portion upon its opposite end by means of which the latch lever may be operated, a cam face on said lug for properly guiding said lever into engagement with said notch, and a spring tending to hold said lever in the notch thereby preventing the relative rotation of the sections.

3. In a hose coupling, a section, a keeper outstanding from the section, a casing carried by the section, a transverse pivot pin in the casing, a latch hinged upon said pin, a nose on said latch adapted to project into said keeper, a finger plate on the outer edge of the latch closing the outer side of the casing, a spring secured to said pivot pin, and engaging at its opposite ends against the inner side of said finger plate and the bottom of said casing to normally extend the latch and hold the nose thereof in the keeper, and a second section adapted to abut the first section, having a lug thereon for engagement in the keeper, and having a cam face to engage the nose of said latch and retract the same against the tension of said spring, said lug having a recess therein adapted to be brought into registry with said nose, whereby said spring is adapted to urge said nose into said recess and interlock the lug with the keeper.

4. The combination with a pair of hose coupling sections, each having projections adapted to interfit upon the relative turning of the sections, of a housing on each section, and a latch mounted in each housing adapted to engage the opposite projection when the projections are interfitted to hold them together, one of said housings extending longitudinally of its section to provide a hand hold to prevent turning of the section, and the other housing projecting radially from its section to provide a hand lever by means of which the section may be rotated.

5. The combination with a pair of hose coupling sections, and complemental projections on each of said sections, of housings outstanding from the sections to provide handles therefor by means of which the sections may be turned relatively to each other to interfit the complemental projections and hold the sections together, and to disengage the projections to separate the sections, a spring pressed latch in each housing adapted for engagement with an adjacent pair of the complemental sections when interfitted to hold the same from disengagement, and plates on said latches arranged at the outer sides of said housings for engagement with the fingers when grasping the housings, whereby said plates may be readily depressed to retract the latches from the projections in separating said hose coupling sections.

6. The combination with a pair of hose coupling sections having interfitting projections adapted for engagement upon the relative rotation of said sections, of a latch carried by each section adapted for engagement into one pair of said projections when interfitted to lock the same from disengagement, a housing on each section to protect the latches and projecting outwardly from the sections to provide hand holds, one housing extending longitudinally of its section and adapted to be engaged by the hand to hold the section from turning, and the other housing extending radially from the opposite section to provide a hand lever to admit the easy turning of the opposite section, and a swiveled nipple carried by said opposite section for engagement with a hose end, whereby to admit of the free turning of the section by the handle to interlock and separate the sections.

7. The combination with a pair of hose coupling sections, and interfitting projections carried by said sections, of a housing outstanding from each section adjacent one of the projections thereof, a latch mounted in each housing, a transverse pin in each housing engaging the latch for pivotally supporting the same, a U-shaped spring in each housing having a coil intermediate each arm thereof adapted for engagement about the pivot pin at the opposite sides of each latch, the closed ends of said springs engaging against the free ends of said latches and the open ends of the springs engaging in the bottoms of said housings whereby to urge the latches into engagement with the adjacent projection, the outer sides of said housings being open, and latch plates on the outer edges of said latches adapted to close said open sides of the housings and to lie in position to be depressed to release the latches by the fingers engaging the housings.

In testimony, that I claim the foregoing as my own, I have hereto affixed my signature in the presence of two witnesses.

RANDOLPH N. MARTZ.

Witnesses:
A. LE ROY McCARDELL,
WARD C. ANGLEBERGER.

Copies of this patent may be obtained for five cents each, by addressing the "Commissioner of Patents, Washington, D. C."